United States Patent [19]

Deloach, Jr.

[11] 4,283,072
[45] Aug. 11, 1981

[54] INTEGRAL VEHICLE TRAILER HITCH AND ELECTRICAL SYSTEM

[76] Inventor: Frank Deloach, Jr., 2908 Spanford Rd., Panama City, Fla. 32405

[21] Appl. No.: 77,675

[22] Filed: Sep. 21, 1979

[51] Int. Cl.³ .......................... B60D 1/06; B60D 1/08
[52] U.S. Cl. .............................. 280/422; 200/61.58 R; 280/511
[58] Field of Search .............. 280/422, 420, 511, 512, 280/513; 200/61.58 R

[56] References Cited

U.S. PATENT DOCUMENTS

| 1,926,264 | 9/1933 | Connors | 280/422 |
| 2,564,520 | 8/1951 | Blasdell | 280/511 |
| 3,116,940 | 1/1964 | Jines | 280/511 |
| 3,181,887 | 5/1965 | Boylan | 280/422 |
| 3,328,741 | 6/1967 | Brown | 280/422 |

*Primary Examiner*—John P. Silverstrim
*Attorney, Agent, or Firm*—Bailey, Dority & Flint

[57] ABSTRACT

Trailer hitch apparatus is disclosed of the type having a ball and socket coupling wherein the ball includes an upper cap and lower ball section with opposing overlying faces in which electrical contacts are incorporated and wherein the upper cap section is suspended in the socket coupling and contoured to seat with the lower ball section to provide an unlimited universal-type action to insure positive electrical contact regardless of tilting and rotational movements.

11 Claims, 6 Drawing Figures

U.S. Patent
Aug. 11, 1981
4,283,072
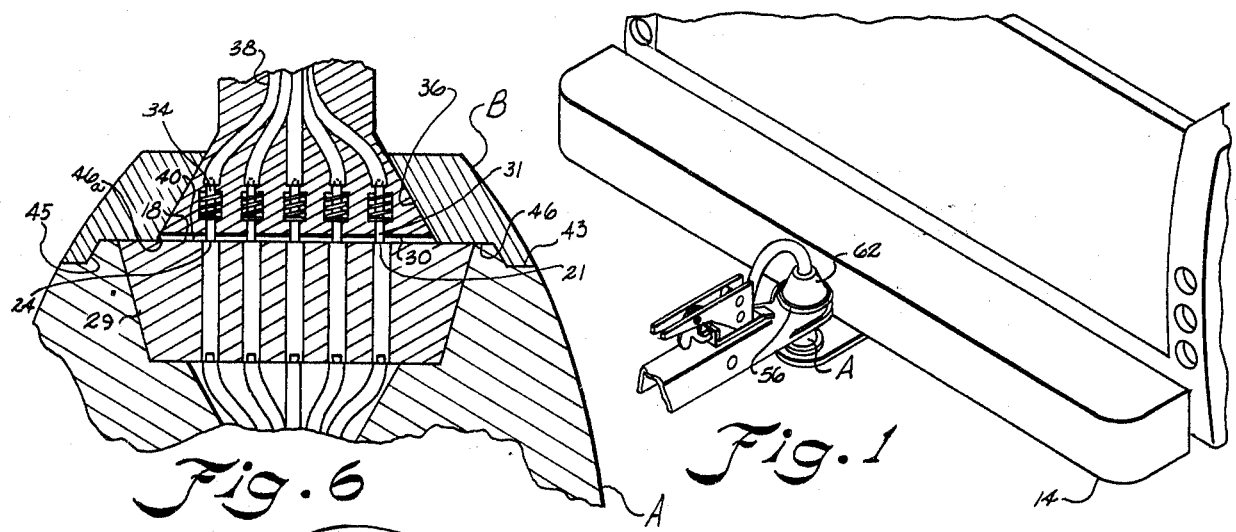
Fig. 6
Fig. 1
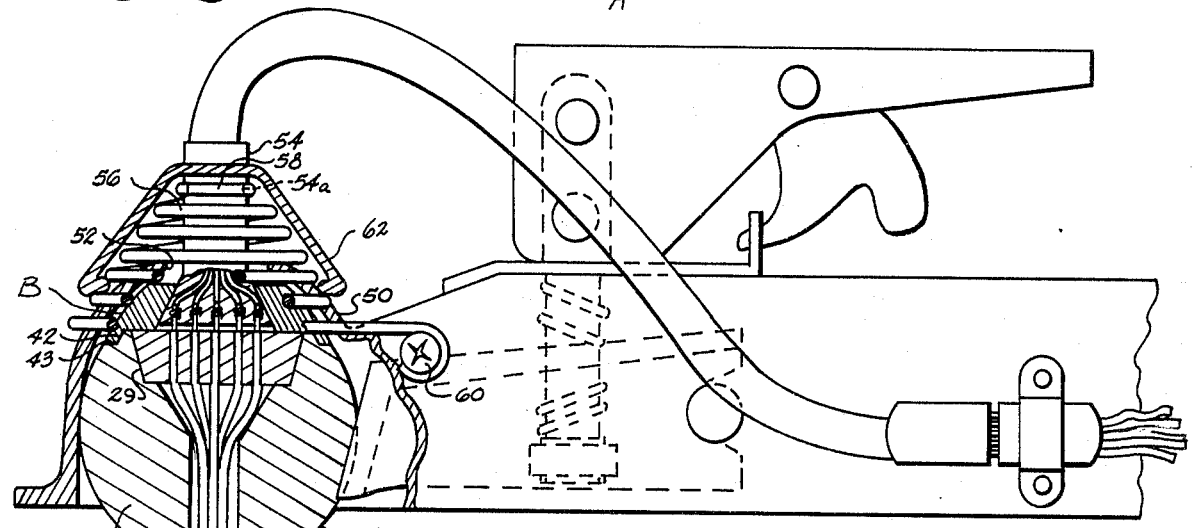
Fig. 2
Fig. 3
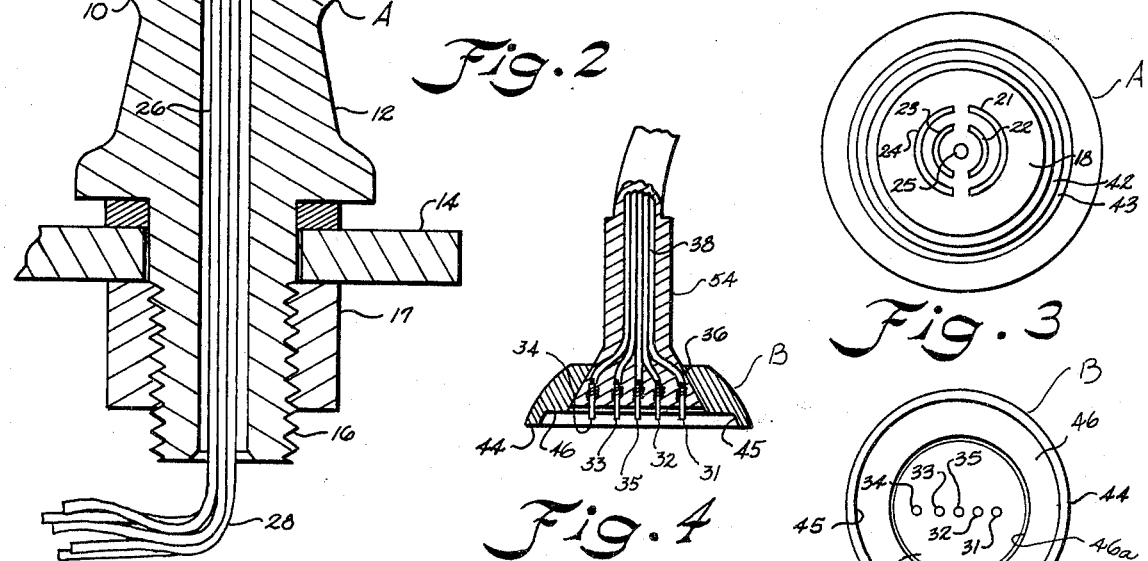
Fig. 4
Fig. 5

INTEGRAL VEHICLE TRAILER HITCH AND ELECTRICAL SYSTEM

BACKGROUND OF THE INVENTION

With the increasing use of recreation trailer vehicles and the like, the provision of simplified yet reliable towing equipment has demanded considerable attention. In particular, simplified reliable hookup of the trailer lights and automobile lights is needed which affords fail-proof hookup and use. Numerous arrangements have been utilized for wiring the lights of the trailer to the towing vehicle, however, the practice has been mainly to run separate wires between the trailer and towing vehicle which is highly susceptible to failure due to the damage of the wires resulting from being exposed.

U.S. Pat. No. 3,328,741 discloses a ballsocket trailer hitch wherein the electrical contacts built into the trailer hitch. Such structure provides electrical contact only over ninety degrees and the number of electrical connections which may be made is limited. Furthermore, the trailer hitch device requires a special socket coupling attached to the trailer vehicle which is not readily interchangeable with conventional ball elements nor is the ball adaptable to conventional coupling structures.

SUMMARY OF THE INVENTION

It has been found that integral trailer hitch and electrical system apparatus can be had by providing a trailer ball of the spherical type which is divided horizontally into an upper cap section and a lower ball section with cooperating electrical contacts carried in overlying opposing faces and wherein the division is above a center axis of the ball so that the structural integrity of the ball is not jeopardized during forward and backward propulsions. The upper cap and lower ball sections include cooperating chamfered contoured surfaces which mate to provide a universal ball joint type action and provide positive contact between the electrical contacts. Due to the chamfered fit and a clearance space designed between the opposing faces, the trailer weight is carried entirely by the cap and ball sections with no weight on the electrical contacts.

Accordingly, an important object of the present invention is to provide an integral trailer hitch and electrical system hookup which eliminates loose wiring laying in the trunk or hanging under the towing vehicle.

Another important object is to provide a trailer hitch and integral electrical system having a two-piece trailer hitch ball wherein the electrical contacts are enclosed with the structural integrity of the ball maintained under towing forces.

Yet another important object of the present invention is to provide integral trailer hitch and electrical system apparatus which virtually eliminates the chance that the towing vehicle operator will forget to hook up the electrical system of the trailer and which prevents the electrical system from being disconnected while in tow.

Still another important object of the present invention is the provision of a trailer hitch ball having an upper and lower section which include electrical contacts facilitating electrical connection between a trailer and a towing vehicle wherein a ball joint type action is provided between the sections of the ball insuring positive contact.

Still another important object of the present invention is to provide integral trailer hitch and electrical system apparatus wherein the possibility of theft of the expensive connectors conventionally used on recreation trailers and the like is prevented.

Still another important object of the present invention is to provide an integral trailer hitch and electrical system apparatus which can be readily adapted to present trailer hitch couplers found on the market by the average trailer owner.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating integral trailer hitch and electrical system apparatus according to the invention;

FIG. 2 is an enlarged partially cut-away view illustrating trailer hitch apparatus and integral electrical system according to the invention in section;

FIG. 3 is a top plan view of a lower ball section constructed according to the invention;

FIG. 4 is a sectional view of an upper cap section according to the invention;

FIG. 5 is a bottom plan view of the cap section of FIG. 4; and

FIG. 6 is an enlarged elevational view in section of a contoured ball section and mating cap section constructed according to the invention.

DESCRIPTION OF A PREFERRED EMBODIMENT

The drawings illustrate trailer hitch apparatus of the ball and socket coupling type having an integral electrical system by which mechanical and electrical connection between a towing vehicle and a trailer vehicle may be made simultaneously. The apparatus includes a ball section A adapted for connection to the towing vehicle and a cap section B carried by the socket coupling overlying the ball section. Electrical contact means are carried by opposing faces of the ball and cap sections providing conduction of electricity therethrough when the cap member is seated in the overlying position. Connection means connected to the cap section B is provided for carrying the cap within the socket coupling in a floating suspended configuration enabling the cap member to float and maintain a close overlying fit with the ball section and contact between the electrical contact means regardless of the relative tilting and rotational movements between the ball section, cap section, and socket coupling during tow operations.

As illustrated, the ball section A includes an ball element 10 and a shank portion 12 which is adapted for connection to the bumper or like frame of a towing vehicle 14 in a conventional manner by means of a threaded stud 16 and nut 17. A top portion of the ball element 10 includes a planar face 18 in which is carried electrical contact means in the form of fixed, one hundred and eighty degree arcuate contact surfaces 21, 22, 23 and 24. In addition, a central contact surface 25 is provided which serves as a ground. The ball section A includes a central bore 26 in which suitable electrical wiring 28 is routed which makes electrical connection to the electrical contact surfaces 21 through 25 and the corresponding lighting system of the towing automobile or vehicle. The contact arcs may comprise any suitable conductive material such as solder babbit encapsulated with wiring 28 in a suitable insulating media 29 such as a resin or hard plastic. It may be preferred to enlarge the threaded stud and nut to one inch to insure no loss of tensile strength as a result of the bored passageway.

The cap section B overlies the ball section and seats with the ball element 10 when in an operation position as best seen in FIGS. 2 and 6. Cap section B includes an opposing face 30 which opposes the face 18 of the ball section A and carries electrical contact means in the form of a plurality of spring biased pins 31, 32, 33, 34 and 35 which mate with the respective electrical contact surfaces 21 through 25 of the ball element A. Cap member B includes a hollow central portion 36 in which the spring loaded contacts and electrical wiring 38 connected thereto are encapsulated in a suitable material such as phenolic resin, or plastic, or other suitable electrical insulating material. The electrical wiring 38 would be routed to make electrical connection with the corresponding light system of the trailer vehicle so as to correspond to the lighting system of the towing vehicle. In one application the five circuit connection can facilitate the following service; tail light in parallel with running lights, left turn signal light, right turn signal light, a stop light and electrical brakes connected in parallel to activating solenoid of brakes, separate single circuit to brakes for independent operation separate from stop light circuit.

It will be understood, that the spring loaded plungers or pins 31 through 35 may be made in any suitable manner such that when the cap section B and ball section A are fitted together in the operational position in which they overlie one another with faces as shown in FIGS. 3 and 5 mating, the pins will be depressed and the biasing spring thereof will be compressed so as to bias the pins in contact with its respective contact surface on the opposing face 18 of the ball element. The arcuate contact surfaces provide ninety degrees of turning arc in either turning direction.

As can be best seen in FIGS. 2 and 6, a small clearance space 40 is defined between the opposing faces 18 and 30 of the ball and cap sections when overlying and seated with one another. The interfacing portions of the ball and cap sections are shaped and contoured such that the cap and ball sections seat integrally and act as a universal ball-type joint which insures positive seating contact of the electrical contacts. The floating suspension of cap section B aids in this action and will be more fully explained hereinafter. The cap section jointly with the ball section carries the weight of the trailer vehicle which is exerted on the trailer hitch coupling.

As illustrated, the contour of the mating surfaces includes a chamfered shoulder 42 formed on a top portion of ball element 10 which terminates in a horizontal rim portion 43 in one direction and terminates at the opposing face 18 in the opposite direction. The cap section has a reverse chamfer to accommodate the chamfered shoulder 42 of the ball element which includes a horizontal flange 44 mating with the rim 43 of the ball element, and an inclined chamfered interior recessed surface 45 which mates with the shoulder 42 of the ball element and terminates at surfaces 46 which is slightly chamfered and terminates at the face 30 opposing the face 18. Due to the contoured interfacing and seating of the cap and ball sections and the design of clearance space 40, the cap and ball sections carry the weight of the trailer vehicle and the electrical contacts carry no part of this weight. The spring pressure of the individual spring biased pins represent the only weight on the electrical contacts thus affording a minimum of frictional wear to either side. In one embodiment, the pins have a length of travel of approximately 0.115 of an inch and clearance space 40 is 0.015 inches. It is to be understood that the chamfered shoulder 42 and recess 45 could be reversed. That is, the shoulder formed on the cap and the recess in the ball.

The socket coupling 50 within which cap section B is carried may be of conventional construction and supplied with the trailer hitch apparatus or an existing trailer hitch socket coupling may be adapted to accommodate the cap section of the present invention. The only modification required is the formation of an opening 52 through which a cap section B is suspended. As illustrated, the socket coupling includes the central aperture 52 through which a stem 54 of integral with cap member B extends. The connection means which suspends the cap section within the socket coupling includes a conical spiral spring member 56 which is connected to the cap section by means of a top rung 58 of the spring member being clamped and fitted within a recess 54a formed in the stem 54. The remote portion of the spring element is connected to the exterior of the socket coupling by means of a sheet-metal screw 60. A rubber cap 62 is then provided to cover the spring and the central opening 52 to aid in preventing any water from entering the electrical connections. This suspension of the cap member B within the socket coupling provides a floating resilient suspension whereby the cap member B overlies and seats with the ball element in such a manner that the opposing faces 18 and 30 are maintained in continuous and positive contact for electrical conduction therebetween regardless of the relative rotational tilting action between the ball section A, cap section B, and coupling socket. In this manner, the cap and ball sections act together as a universal joint accommodating all of the play and movement which is produced during the towing of the trailer vehicle always maintaining a continuous positive contact between the spring biased pins and electrical contact surfaces. Thus, with the ball and cap sections seated, the electrical contacts are internally housed preventing same from accidental damage and weathering.

It will be noted that the cap and ball sections when seated together form a continuous spherical ball having the same shape as a conventional trailer hitch ball. This enables any conventional socket coupling 52 to be adapted for use with the integral trailer hitch and electrical system apparatus of the present invention. The ball is divided horizontally into the cap section and remaining ball section well above the center of ball element so that the structural integrity thereof is maintained at all times as a ball hitch coupling during forward and backward propulsion.

Thus, it can be seen that an advantageous construction can be had according to the invention wherein a spherical ball hitch is divided into two parts, an upper cap and lower ball section, having a chamfered shoulder and recess to insure positive seating and that no weight is carried by electrical contacts and wherein the cap section may be suspended in a conventional socket coupling to provide a ball-joint type action when seated on the ball during tilting and rotational movements.

While a preferred embodiment of the invention has been described using specific terms, such description is for illustrative purposes only, and it is to be understood that changes and variations may be made without departing from the spirit or scope of the following claims.

What is claimed is:

1. A trailer hitch for connecting a towing vehicle having an electrical power source to a towed vehicle having at least one electrically actuated device, said hitch comprising: a ball section adapted to be connected to one of said vehicles, said ball section including a vertically disposed face having electrical contact means and means adapted to connect said contact means to one of said power source and said device; a socket coupling adapted to be connected to the other of said vehicles, said socket coupling including a housing for tiltably and rotationally engaging said ball section for transmitting towing force between said vehicles, a cap section having a vertically disposed face overlying said ball section face, said cap section face having electrical contact means for engaging said ball section contact means, means adapted to connect said cap sectin contact means to the other of said power source and said device, and means for mounting said cap section on said housing whereby said housing may move relative to said cap section during tilting of said housing relative to said ball section, but said cap section may rotate relatively with said housing relative to said ball section; said cap section and said ball section having interengaging means for maintaining said faces in a constant parallel relationship during said tilting whereby said contact means are maintained in interengagement.

2. The apparatus of claim 1 wherein one of said opposing faces of said ball section and cap section is recessed and the other of said opposing faces is contoured to seat within said recess producing a ball-joint type action therebetween.

3. The apparatus of claim 2 wherein said electrical contact means includes a plurality of conducting surfaces carried in one of said opposing faces and a plurality of spring-biased conductive pins carried in the other of said opposing faces resiliently biased against respective ones of said conductive surfaces.

4. The apparatus of claim 3 wherein said ball and cap sections are contoured to overlie and seat with one another so that trailer weight exerted at the socket coupling is carried jointly by said cap and ball sections essentially eliminating any trailer weight on said electrical contact means.

5. The apparatus of claim 3 whwerein said ball and cap sections are contoured to overlie and seat with one another to define a clearance space between said opposing faces thereof so that the only weight exerted by said contact pins on said conductive surfaces is due essentially to said spring bias.

6. The apparatus of claim 13 wherein said ball and cap sections are contoured to overlie and seat with one another so that trailer weight exerted at the socket coupling is carried jointly by said cap and ball sections to the exclusion of said electrical contact means.

7. The apparatus of claim 1 wherein said means for mounting said cap section includes a resilient element connected to said cap section which carries said cap section within said socket coupling in said floating suspended configuration generally out of contact with said housing of said socket coupling.

8. The apparatus of claim 1 including a chamfered shoulder formed on one of said cap or ball sections and a reverse chamfered recess formed in the other of said sections so that said cap and ball sections seat together and provide a ball-joint type action during relative movements therebetween insuring positive electrical contact.

9. Trailer hitch apparatus of the ball and socket coupling type having an integral electrical system wherby mechanical and electrical connection between a towing vehicle and a trailer may be made simultaneously, said apparatus comprising:
 a ball section adapted for connection to said towing vehicle;
 a socket coupling adapted for connection to said towed vehicle;
 a cap section carried by said socket coupling overlying said ball section;
 electrical contact means carried by respective opposing faces of said cap and ball sections providing electrical conduction therebetween when overlying in a seated position;
 contoured interface means formed on said ball and cap sections enabling said sections to seat with one another in an integral manner and carry the trailer weight jointly without any of said weight being carried by said electrical contact means; and
 said ball and cap section generally forming a completed trailer hitch ball when seated in said integral manner accommodating use of conventional socket couplings.

10. The apparatus of claim 9 wherein said electrical contact means includes spring-biased electrical pins carried in one of said faces and one-hundred and eighty degree arcuate electrical surfaces carried in the other of said faces contacting respective pins affording essentially ninety degrees of contact in either turning direction.

11. The apparatus of claim 9 wherein said contoured interface means includes a clearance space defined between said opposing faces.

* * * * *